United States Patent
Logan et al.

(10) Patent No.: US 9,622,187 B2
(45) Date of Patent: Apr. 11, 2017

(54) REAL-TIME SPECIFIC ABSORPTION RATE IMPLEMENTATION IN WIRELESS DEVICES

(71) Applicant: QUALCOMM Incorporated, San Diego, CA (US)

(72) Inventors: Theodore Logan, Boulder, CO (US); Jagadish Nadakuduti, La Jolla, CA (US); Lin Lu, San Diego, CA (US); Paul Guckian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/052,378

(22) Filed: Feb. 24, 2016

(65) Prior Publication Data

US 2017/0064641 A1    Mar. 2, 2017

Related U.S. Application Data

(60) Provisional application No. 62/210,388, filed on Aug. 26, 2015.

(51) Int. Cl.
*H04B 1/04* (2006.01)
*H04W 52/18* (2009.01)
(Continued)

(52) U.S. Cl.
CPC ........... *H04W 52/18* (2013.01); *H04W 52/36* (2013.01)

(58) Field of Classification Search
CPC . H04W 52/04; H04W 52/225; H04W 52/226; H04W 52/283; H04W 52/30
(Continued)

(56) References Cited

U.S. PATENT DOCUMENTS

| 7,558,232 | B2 | 7/2009 | Pearl |
| 9,054,780 | B2 | 6/2015 | Wilson et al. |

(Continued)

FOREIGN PATENT DOCUMENTS

| WO | WO-2011058128 A1 | 5/2011 |
| WO | WO-2013011352 A1 | 1/2013 |
| WO | WO-2016053930 A1 | 4/2016 |

OTHER PUBLICATIONS

International Search Report and Written Opinion—PCT/US2016/044110—ISA/EPO—Oct. 6, 2016.

*Primary Examiner* — Lee Nguyen
(74) *Attorney, Agent, or Firm* — Loza & Loza LLP

(57) ABSTRACT

Embodiments disclosed herein provide a method and apparatus for optimizing time-averaged transmitter power of a communications device. A time-averaged SAR is computed over a predefined time window using past transmitter power levels with minimum transmitter power equal to reserve transmitter power for any time interval. Based on the time-averaged SAR a maximum allowable transmitter power for a future fixed time interval is determined. The communication device then transmits at a power equal to or less than the maximum allowable transmitter power. The communication device may back off from high transmitter power to a reserve transmitter power when calculated time-averaged SAR approaches the SAR limit. When old high power transmissions expire, the communication device gains SAR margin and may then transmit at high power. The apparatus comprises: at least one antenna, a transmitter in communication with a power supply, a receiver, a timer in communication with a processor, and a memory.

30 Claims, 6 Drawing Sheets

(51) Int. Cl.
*H04W 52/36* (2009.01)
*H04B 1/034* (2006.01)

(58) Field of Classification Search
USPC .................................. 455/127.1, 127.2, 522
See application file for complete search history.

(56) References Cited

U.S. PATENT DOCUMENTS

| | | |
|---|---|---|
| 2012/0071195 A1* | 3/2012 | Chakraborty ........ H04B 1/3838 455/522 |
| 2013/0331069 A1 | 12/2013 | Tsai et al. |
| 2014/0274189 A1 | 9/2014 | Moller et al. |
| 2015/0223131 A1 | 8/2015 | Brisebois et al. |
| 2016/0098053 A1* | 4/2016 | Khawand .................. G05F 3/02 307/116 |

* cited by examiner

REAL-TIME SPECIFIC ABSORPTION RATE IMPLEMENTATION IN WIRELESS DEVICES

CROSS-REFERENCE TO RELATED APPLICATION(S)

This application claims the benefit of U.S. Provisional Application Ser. No. 62/210,388, entitled "Real-Time Specific Absorption Rate Implementation in Wireless Devices," filed on Aug. 26, 2015, which is expressly incorporated by reference herein in its entirety.

BACKGROUND

Field

The present disclosure relates generally to communication systems, and more particularly, to a method and apparatus for managing specific absorption rate (SAR) distribution to maintain radio connection while simultaneously providing bursts of high power.

Background

Wireless communication devices have become smaller and more powerful as well as more capable. Increasingly users rely on wireless communication devices for mobile phone use as well as email and Internet access. At the same time, devices have become smaller in size. Devices such as cellular telephones, personal digital assistants (PDAs), laptop computers, and other similar devices provide reliable service with expanded coverage areas. Such devices may be referred to as mobile stations, stations, access terminals, user terminals, subscriber units, user equipment, and similar terms.

A wireless communication system may support communication for multiple wireless communication devices at the same time. In use, a wireless communication device may communicate with one or more base stations by transmissions on the uplink and downlink. Base stations may be referred to as access points, Node Bs, or other similar terms. The uplink or reverse link refers to the communication link from the wireless communication device to the base station, while the downlink or forward link refers to the communication from the base station to the wireless communication devices.

Wireless communication systems may be multiple access systems capable of supporting communication with multiple users by sharing the available system resources, such as bandwidth and transmit power. Examples of such multiple access systems include code division multiple access (CDMA) systems, time division multiple access (TDMA) systems, frequency division multiple access (FDMA) systems, wideband code division multiple access (WCDMA) systems, global system for mobile (GSM) communication systems, enhanced data rates for GSM evolution (EDGE) systems, and orthogonal frequency division multiple access (OFDMA) systems.

Wireless devices, including mobile telephones, are required to undergo testing to determine the amount of RF energy a user may be exposed to when using the device. In the U.S., the Federal Communications Commission (FCC) certifies mobile devices to ensure compatibility with requirements and user safety. The maximum power that a mobile device may use when transmitting is affected by the fact that users position the device against their head and body. The close proximity or contact is behind the FCC requirements setting limits on the specific absorption rate (SAR). SAR is defined as the power absorbed per unit mass of tissue in mW/g by regulatory bodies, including the FCC. Current FCC testing requirements allow for a finite separation distance between the smartphone and the torso portion of a human phantom.

FCC certification of wireless devices requires SAR measurements be taken by attaching the wireless device to a phantom (representing the human body). This phantom is filled with a tissue simulating liquid. The required measurements are taken in five positions relative to the human body and produce five different SAR distributions. Additional SAR measurements are also required at multiple channels in a given frequency band for a particular antenna and transmitter combination. The FCC reviews the data from all positions and channels, resulting in the reporting of hundreds of measurements for all bands, transmitter, and antenna combinations.

The testing is used to determine maximum transmitter power for the band, transmitter, and antenna combination. The result may be a limitation on transmitter power. Current FCC testing allows for a finite separation distance between the mobile device and the flat body phantom. As the use of smartphones increases and the devices used in pockets and worn on the body, the FCC may require SAR testing with zero separation distance. This will drastically reduce the maximum allowable transmit power.

The testing procedures described above result in a SAR limit based on the maximum average power. However, the current compliance test procedure effectively results in enforcing an instantaneous power-based SAR, which results in an overly conservative power limit. This poses a potential roadblock for new technology development.

SAR is directly proportional to transmit power. Since the time-averaged transmit power should be less than the regulatory limit, a transmitter may only transmit at high power for short bursts of time and once the SAR limit is reached the call may be dropped. There is a need in the art for a method of managing SAR to allow a transmitter to reserve some power to maintain the radio connection while simultaneously providing bursts of high power while complying with regulatory SAR limits.

SUMMARY

Embodiments disclosed herein provide a method for optimizing time-averaged transmitter power of a communications device. The method begins when a time-averaged SAR is computed over a predefined time window. When computing time-averaged SAR, the method assumes that transmitter power is equal to at least reserve power at all time intervals. If the time-averaged SAR is below the SAR limit, then the method determines the maximum allowable transmit power for the next time interval based on the available SAR margin. The communication device then begins transmitting at a level equal to or less than this computed maximum allowable transmitter power. This process of computing time-averaged SAR, determining SAR margin and allowable maximum transmit power is repeated every fixed time interval, say five seconds. As the computed time-averaged SAR reaches the SAR limit, i.e., available SAR margin is zero, then the computed maximum allowable transmit power will be equal to reserve transmitter power for the next time interval. The communication device then backs off from high transmitter power to a reserve transmitter power. This backing off occurs after a specific period of time, depending on how soon the total available SAR margin (difference between reserve SAR and SAR limit over predefined time window) is utilized by the mobile device by transmitting at levels higher than the reserve transmitter power. Once the predefined time window concludes, the total SAR margin is available for the communication device, allowing it to return to high transmitter power.

A further embodiment provides a communication device. The apparatus comprises: at least one antenna, a transmitter in communication with a power supply, a receiver, a timer in communication with a processor, and a memory.

A still further embodiment provides an apparatus, comprising: means for computing a time-averaged SAR over a predefined time window; means for determining a maximum allowable transmitter power for the fixed time interval; means for transmitting at the maximum allowable transmitter power; means for backing off the maximum allowable transmitter power to a reserve transmitter power; and means for returning to the maximum allowable transmitter power when a new predefined window begins.

A yet further embodiment provides a non-transitory computer-readable medium containing instructions, which when executed by a processor cause the processor to perform the steps of: computing a SAR over a predefined time window; determining a maximum allowable transmitter power for the next time interval based on the available SAR margin; transmitting at or below the maximum allowable transmitter power, which may be equal to reserve transmitter power; and returning to a new maximum allowable transmitter power every time interval.

DETAILED DESCRIPTION

Figure 1:
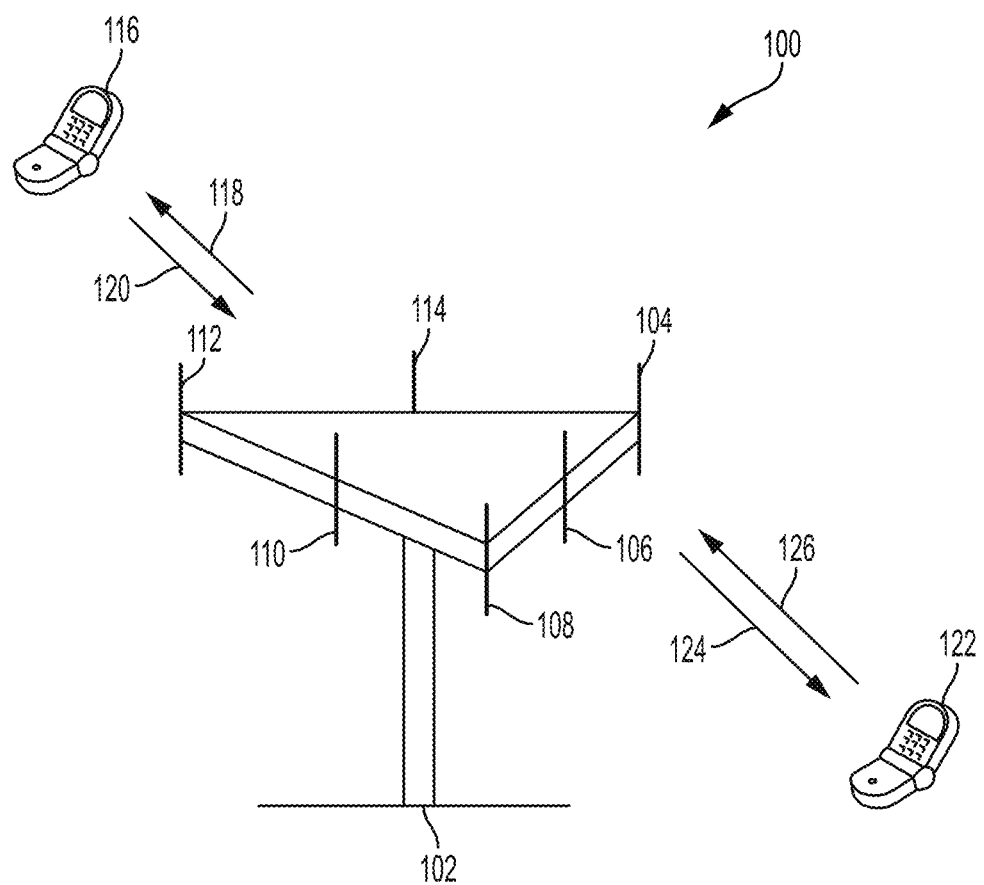
FIG. 1 illustrates a wireless multiple-access communication system, in accordance with certain embodiments of the disclosure.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

As used in this application, the terms "component," "module," "system," and the like are intended to refer to a computer-related entity, either hardware, firmware, a combination of hardware and software, software, or software in execution. For example, a component may be, but is not limited to being, a process running on a processor, an integrated circuit, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network, such as the Internet, with other systems by way of the signal).

Furthermore, various aspects are described herein in connection with an access terminal and/or an access point. An access terminal may refer to a device providing voice and/or data connectivity to a user. An access wireless terminal may be connected to a computing device such as a laptop computer or desktop computer, or it may be a self-contained device such as a cellular telephone. An access terminal can also be called a system, a subscriber unit, a subscriber station, mobile station, mobile, remote station, remote terminal a wireless access point, wireless terminal user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. An access point, otherwise referred to as a base station or base station controller (BSC), may refer to a device in an access network that communicates over the air-interface, through one or more sectors, with wireless terminals. The access point may act as a router between the wireless terminal and the rest of the access network, which may include an Internet Protocol (IP) network, by converting received air-interface frames to IP packets. The access point also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ), and integrated circuits such as read-only memories, programmable read-only memories, and electrically erasable programmable read-only memories.

Various aspects will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Other aspects, as well as features and advantages of various aspects, of the present invention will become apparent to those of skill in the art through consideration of the ensuing description, the accompanying drawings and the appended claims.

FIG. 1 illustrates a multiple access wireless communication system 100 according to one aspect. An access point 102 (AP) includes multiple antenna groups, one including 104 and 106, another including 108 and 110, and an additional one including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over downlink or forward link 118 and receive information from access terminal 116 over uplink or reverse link 120. Access terminal 122 is in communication with antennas 106 and 108, where antennas 106 and 108 transmit information to access terminal 122 over downlink or forward link 124 and receive information from access terminal 122 over uplink or reverse link 126. In a Frequency Division Duplex (FDD) system, communication links 118, 120, 124, and 126 may use a different frequency for communication. For example, downlink or forward link 118 may use a different frequency than that used by uplink or reverse link 120.

Each group of antennas and/or the area in which they are designed to communicate is often referred to as a sector of the access point. In an aspect, antenna groups each are designed to communicate to access terminals in a sector of the areas covered by access point 102.

In communication over downlinks or forward links 118 and 124, the transmitting antennas of access point utilize beamforming in order to improve the signal-to-noise ratio (SNR) of downlinks or forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a Node B, an evolved Node B (eNB), or some other terminology. An access terminal may also be called a mobile station, user equipment (UE), a wireless communication device, terminal, or some other terminology. For certain aspects, either the AP 102, or the access terminals 116, 122 may utilize the proposed Tx-echo cancellation technique to improve performance of the system.

Figure 2:
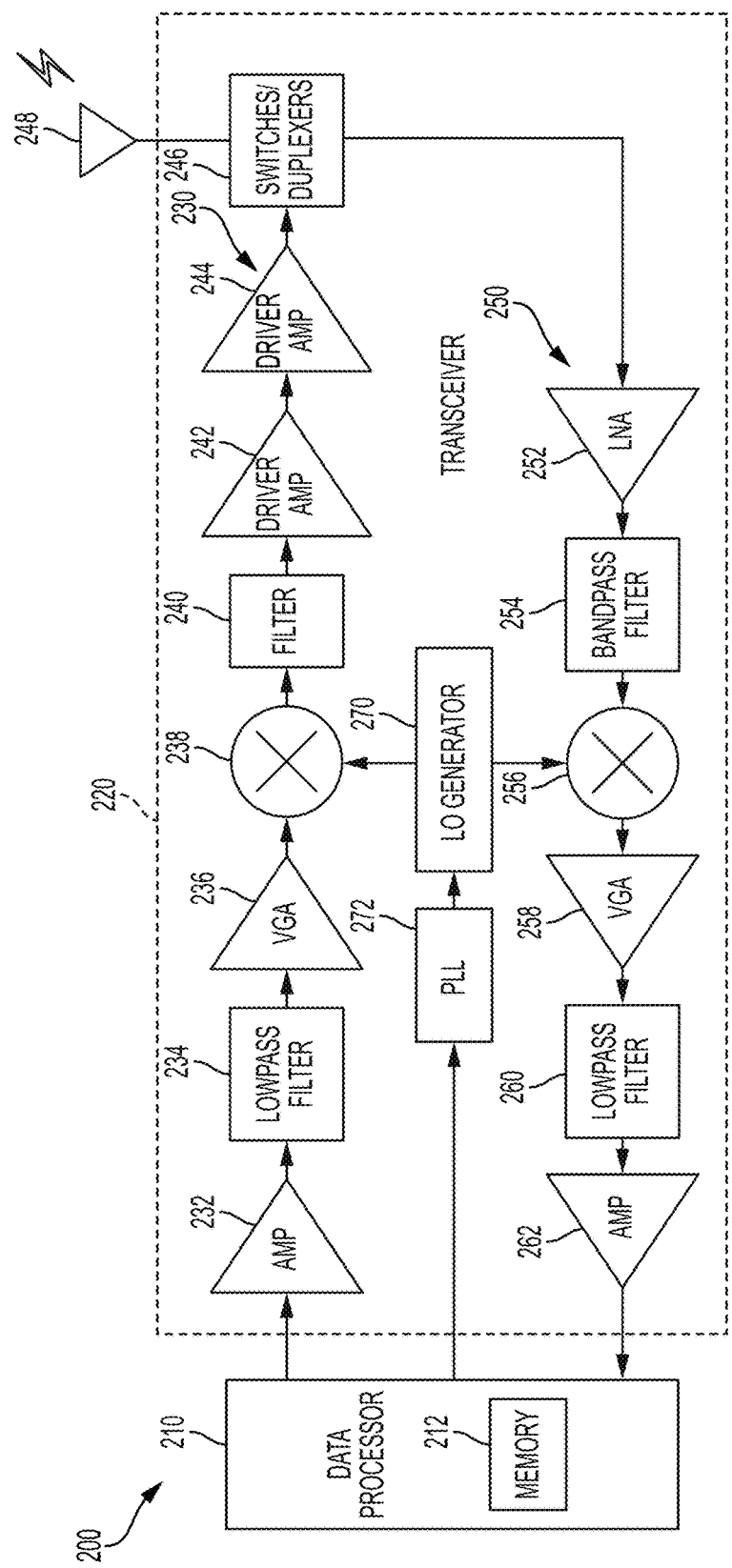
FIG. 2 illustrates a block diagram of a wireless communication system in accordance with certain embodiments of the disclosure.

FIG. 2 shows a block diagram of an exemplary design of a wireless communication device 200. In this exemplary design, wireless device 200 includes a data processor 210 and a transceiver 220. Transceiver 220 includes a transmitter 230 and a receiver 250 that support bi-directional wireless communication. In general, wireless device 200 may include any number of transmitters and any number of receivers for any number of communication systems and any number of frequency bands.

In the transmit path, data processor 210 processes data to be transmitted and provides an analog output signal to transmitter 230. Within transmitter 230, the analog output signal is amplified by an amplifier (Amp) 232, filtered by a low-pass filter 234 to remove images caused by digital-to-analog conversion, amplified by a variable gain amplifier (VGA) 236, and upconverted from baseband to RF by a mixer 238. The upconverted signal is filtered by a filter 240, further amplified by a driver amplifier 242, and a power amplifier 244, routed through switches/duplexers 246, and transmitted via an antenna 249.

In the receive path, the antenna 248 receives signals from base stations and/or other transmitter stations and provides a received signal, which is routed through switches/duplexers 246 and provided to receiver 250. Within receiver 250, the received signal is amplified by a low noise amplifier (LNA) 252, filtered by a bandpass filter 254, and downconverted from RF to baseband by a mixer 256. The downconverted signal is amplified by a VGA 258, filtered by a low-pass filter 260, and amplified by an amplifier 262 to obtain an analog input signal, which is provided to data processor 210.

FIG. 2 shows transmitter 230 and receiver 250 implementing a direct-conversion architecture, which frequency converts a signal between RF and baseband in one stage. Transmitter 230 and/or receiver 250 may also implement a super-heterodyne architecture, which frequency converts a signal between RF and baseband in multiple stages. A local oscillator (LO) generator 270 generates and provides transmit and receive LO signals to mixers 238 and 256, respectively. A phase locked loop (PLL) 272 receives control information from data processor 210 and provides control signals to LO generator 270 to generate the transmit and receive LO signals at the proper frequencies.

FIG. 2 shows an exemplary transceiver design. In general, the conditioning of the signals in transmitter 230 and receiver 250 may be performed by one or more stages of amplifier, filter, mixer, etc. These circuits may be arranged differently from the configuration shown in FIG. 2. Some circuits in FIG. 2 may also be omitted. All or a portion of transceiver 220 may be implemented on one or more analog integrated circuits (ICs), RF ICs, (RFICs), mixed-signal ICs, etc. For example, amplifier 232 through power amplifier 244 in transmitter 230 may also be implemented on an RFIC. Driver amplifier 242 and power amplifier 244 may also be implemented on another IC external to the RFIC.

Data processor 210 may perform various functions for wireless device 200, e.g., processing for transmitter and received data. Memory 212 may store program codes and data for data processor 210. Data processor 210 may be implemented on one or more application specific integrated circuits (ASICs) and/or other ICs.

Wireless devices, such as mobile phones used in the network described above in FIG. 1 generate transmit power that, at high levels, may exceed limits on RF energy exposure to humans. This transmit power is used to access the network and is generated by the transmit chain described in FIG. 2. The transmit power of the mobile device, when used in close proximity to humans, should not exceed the limits on the amount of RF energy absorbed by humans.

SAR is a measure of the rate at which energy is absorbed by the human body when exposed to an RF electromagnetic field. SAR is defined as the power absorbed per mass of tissue, and has units of watts per kilogram (W/Kg). SAR may be either averaged over the entire body, known as whole body exposure, or averaged over a smaller sample volume (typically 1 g or 10 g of tissue), known as localized exposure. The resulting value cited is the maximum level measured in the body part studied over the stated volume or mass.

The SAR for electromagnetic energy may be calculated from the sum of the electric field within the tissue as:

$$SAR = \int_{sample} \frac{\sigma(r)|E(r)|^2}{\rho(r)} dr$$

where σ is the sample electrical conductivity
E is the root mean square (RMS) electric field
ρ is the sample density
r covers the sample region of the body SAR measures exposure to RF fields between 100 kHz and 10 GHz (generally known as radio waves). It is commonly used to measure the power absorbed by the human body. The SAR value is significantly dependent on the geometry of the body part exposed to the RF energy, and also on the exact location and geometry of the RF source. As a result, each mobile device model may be tested with each specific source at the intended use position.

When measuring the SAR of a wireless device the device is placed at the head in a talk position or flat next to the body phantom. The SAR is then measured in the region of head/body phantom exposed by the wireless device in order to determine the highest SAR value. Typically, for a wireless device, the highest values of SAR can be generated near the antenna. SAR values may depend heavily on the size of the averaging volume.

The maximum transmit power a mobile device may use when transmitting in close proximity with humans is dictated by the limit set on SAR, that is, the power absorbed per unit of mass in tissue in mW/g. This limit is set by various regulatory bodies worldwide. In the U.S., the FCC sets SAR limits for mobile device transmitters.

Figure 3:
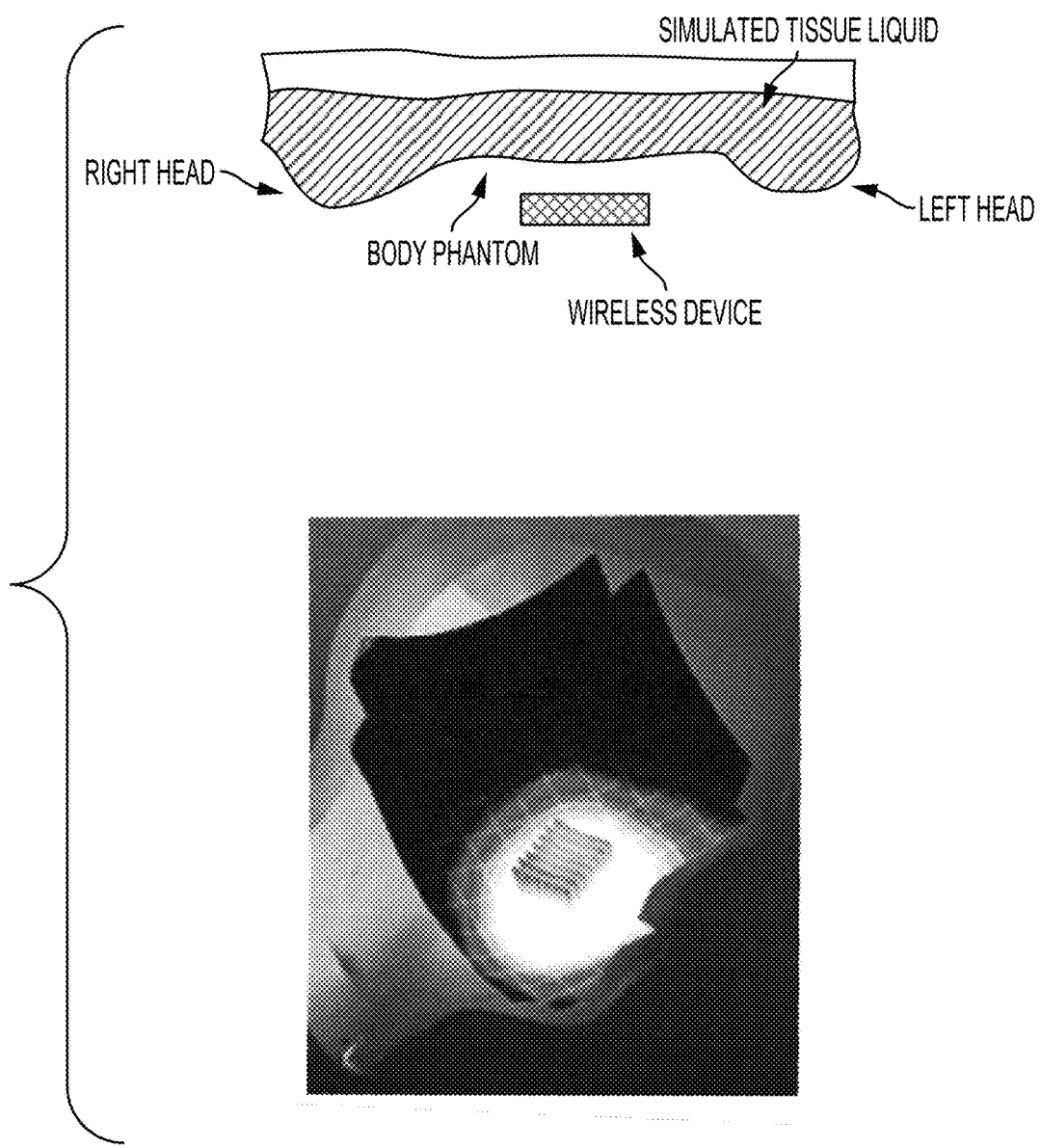
FIG. 3 illustrates a human phantom used for SAR testing and also illustrates a SAR distribution of a transmitter, in accordance with certain embodiments of the disclosure.

For the body phantom SAR, current FCC testing allows for a finite separation distance between the smartphone device and a human phantom. FIG. 3 depicts the SAR measurement set up with a body phantom. At present, testing allows for a finite separation distance between the mobile device and the body phantom, that varies from device to device. At this separation distance a mobile phone may transmit at a desired power level. As smartphones and other mobile devices have become more heavily used and incorporated into daily life, it is possible that regulatory bodies may, in the near future, require SAR testing with closer or zero separation distance. This limitation may result in a drastic limitation on maximum transmit power.

Embodiments described below provide a method for optimal time-averaging to implement a SAR algorithm in the modem of a wireless device. The wireless device may be capable of seamlessly transitioning from one technology band to another while maintaining the radio connection while remaining in compliance with SAR regulatory limits.

In the United States the FCC requires that wireless devices be certified before being offered for sale or use. The certification process requires spatial specific absorption rate (SAR) in W/Kg measurements. These measurements are made by attaching the wireless device to a phantom representing the human body. The phantom is filled with a tissue simulating liquid. With the wireless device attached to the phantom measurements are taken in five positions: left cheek/tilt, right cheek/tilt, and flat body. Each measurement produces a different SAR distribution. Additional SAR measurements must be performed at low, mid, and high channel levels in a given band for the particular antenna and transmitter combination. Once the data has been collected the FCC reviews the data for all five positions and channels for each band and mode. These requirements result in device manufacturers submitting hundreds of measurements for all bands and transmitter and antenna combinations.

The FCC SAR limit is specified based on the maximum average power. However, the existing compliance test procedures effectively enforce an instantaneous power-based SAR, which results in an overly conservative power limit and poses problems for new technology growth and development.

One method to maximize the transmit power is to use a real-time SAR algorithm to perform the time-averaged SAR assessment over a given time window, e.g., six minutes recommended by the International Commission on Non-Ionizing Radiation Protection (ICNIRP) standard, to determine the maximum allowable average transmitter power. This maximum allowable transmitter power may be computed using pre-stored SAR information.

SAR is directly proportional to the transmit power. Because the time-averaged transmitter power must be less than the regulatory limit, the transmitter may only transmit at high power for short bursts of time. These short bursts may be used for transmitting data files or other similar files. Embodiments described below provide a method and apparatus for a transmitter to hold some power in reserve to maintain the radio connection, while providing bursts of high power while remaining compliant with the time-averaged SAR requirements specified by the regulatory agencies.

FIG. 3 shows the spatial SAR distribution for an antenna located at the bottom of a mobile device. As shown in FIG. 3, the SAR is concentrated near the antenna location with the intensity, as indicated by brightness, tapering off with distance from the antenna. Similar spatial distributions are produced for each band, antenna and transmitter combination.

Presently, computing SAR values in real-time requires computation of the SAR for all five positions in real-time in order to identify the worst-case exposure scenario. The worst case value is used to compute conservative SAR estimation, which in turn results in a conservative value for maximum transmitting power. These computations and storage require significant on-device memory capability and computation resources. These computations require brute force time-averaging of SAR values and may result in dropping a call when there is no SAR margin remaining.

Figure 4:
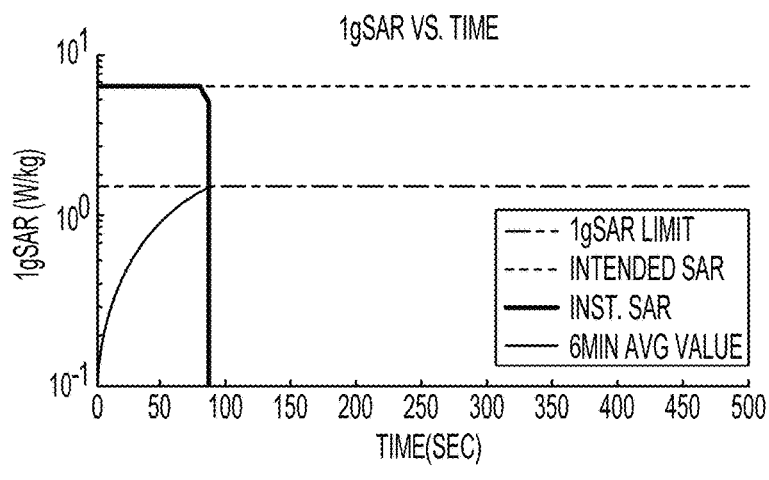
FIG. 4 is a graph depicting an approach using time-averaged SAR and the results produced by a method of optimal real-time SAR implementation, in accordance with certain embodiments of the disclosure.
Figure 4:
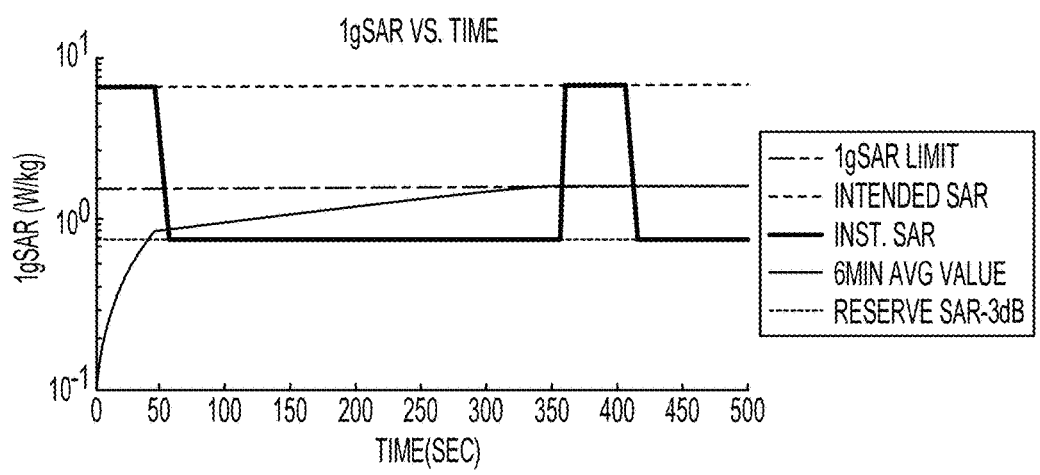

FIG. 4 provides a comparison of the typical current approach and the embodiments described herein. The first graph in FIG. 4 illustrates how the typical current approach operates. In the present method, time-averaging of SAR is performed and when the limit is reached the transmitter is turned off, resulting in a dropped call and a poor user experience. As the first graph illustrates the six-minute average SAR value rises until the 1 g SAR limit is reached. When the 1 g SAR limit is reached the call is dropped, at 90 seconds in this example in order for the wireless device to remain SAR compliant.

In this current approach most mobile phones or comparable wireless devices are limited by network technology to transmit at a lower power in order not to exceed the SAR limit for a predefined time-average window. The wireless device may transmit at high power and could use up all of the allowable transmit power during a short interval, and then the device must go silent for the remainder of the time window. The time window may be varied depending on the regulatory requirements, and the six-minute window described above is intended as an example and not as a limitation.

In the second graph in FIG. 4 an embodiment provides for a reserve power margin. In this embodiment, transmitter power is backed off earlier, such as at sixty seconds, instead of the ninety seconds obtained from brute-force time-averaging approach. This power backing off at an earlier time allows the wireless device to preserve some SAR margin in order to continue transmitting at reserve power and to maintain the radio connection. This reserve SAR is shown on the second graph as a dotted line below the 1 g SAR limit. When more margin is available in the future, which may be after six minutes, then the transmitter is allowed to transmit again at the higher power. This allows the transmitter to transmit at high power in short bursts every time-averaging window. In this example, the time-averaging window is six minutes, however, other sizes of time-averaging windows may be used without departing from the scope of the embodiments described herein. The burst transmissions occur within a short period of time with the device then backing quickly off the high power transmission. This gives extra throughput for the burst transmission, but the quick backing off of transmit power permits the long-term average over the window to remain with the SAR threshold. This is in contrast with the current approach which enforces a transmission cut off when the SAR value is deemed likely to exceed the regulatory limit. As noted above, regulatory limits effectively enforce an "instantaneous SAR limit" because when high power transmissions occur, the SAR limit is reached quickly and an immediate cessation of transmission may be needed to remain within the SAR window for that time window. The embodiments described herein permit data transmission/radio connection maintenance even if the device continues to transmit at back-off power. The choice of reserve transmit power level below the SAR threshold is configurable. Selecting a high reserve transmit power will allow only shorter duration of high power burst-transmissions as more SAR margin is reserved. However, since the communication device is guaranteed to transmit at this higher reserve power at all times, the communication device has higher likelihood to survive bad cell coverage areas with poor reception. Similarly, selecting lower reserve power level will provide longer durations of high power burst-transmissions, but the communication device is likelier to drop radio connection in bad coverage areas as it can only guarantee this lower reserve transmit power at all times. The wireless device thus remains SAR compliant throughout the time-averaging window and maintains radio connection.

An embodiment provides for optimizing time-averaging to improve the calculation and optimization of SAR values. The time-averaging algorithm ensures that reserve transmit power is available for future transmission by making certain that the transmit power does not exceed the margin provided by the difference between the SAR transmit power limit and the reserve transmit power over the time-averaging window.

Figure 5:
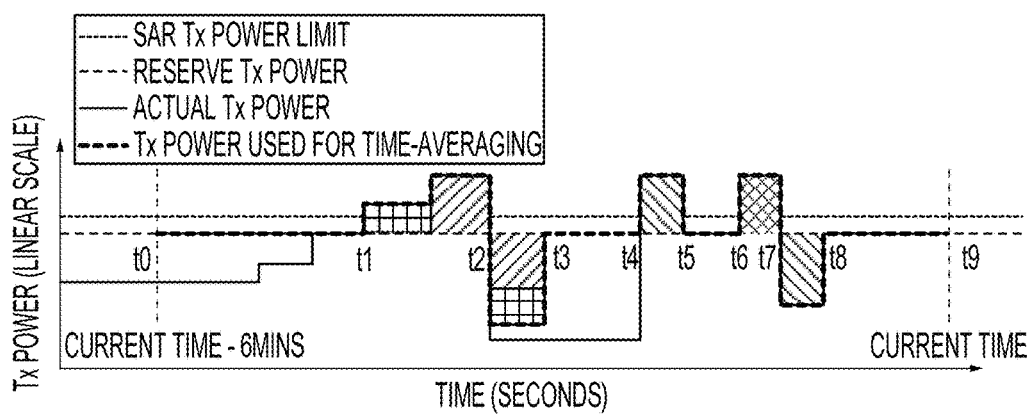
FIG. 5 illustrates the time-averaging used to produce reserve transmit power for future transmission, in accordance with certain embodiments of the disclosure.

FIG. 5 illustrates how the embodiments described herein provide sufficient reserve transmit power for future transmissions. FIG. 5 shows transmit power as a function of time for a wireless device. The transmit power level varies as multiple transmissions occur. Some of these transmissions may be voice communications, while others may be data transmissions. In addition, the wireless device may shift between multiple technologies and frequency bands, as the type of transmission changes. The dashed line in FIG. 5 shows how the transmit power varies with use and is the transmit power value that is used for time-averaging. The solid line superimposed on the dashed line is the minimum power needed to maintain a radio connection. At time t0 a new six minute time window begins. The solid line above the dashed line is the SAR transmit power limit. The margin of power used between the SAR transmit power limit and the reserve power is calculated by treating all transmit powers below the reserve level (seen starting at times t2 and t7), as reserve power. All transmit powers above the reserve power (seen starting at times t1, t4, and t6) as is. An exception to the above occurs when low transmit powers immediately follow high transmit power bursts. This is shown by the high transmit power used at time t1 through t2 and also at time t6. In each case, the high power is followed by a low transmit power. This short-term averaging means that margin from the reserve transmit power is not used and permits the radio connection to be maintained at a minimum reserve transmit power. This is possible because the long-term average of the transmit power over the time window remains within the SAR threshold. The time window may be six minutes, however, other time windows may be used.

A further embodiment provides further refinement to the power optimization. The averaging described above is suitable for normal mobile wireless usage where a user may upload data, surf the internet, or make a call. However, if a user is located at the edge of the network then the selected activity may not be possible if the user's phone is SAR limited. Under these circumstances, a further embodiment provides for a short-term burst of higher power followed by a power back-off. This process may occur over a period of time. This embodiment provides for using the reserve transmit power proportionally to back off the transmit power level earlier, allowing the reserve transmit power to be maintained in the future during the time-averaging window. In this embodiment, the radio connection is maintained while providing short bursts of high power when the SAR margin is available.

A further embodiment provides for recording SAR (or transmit power) samples at fixed time intervals, such as five seconds. This fixed time interval may apply to all technologies and bands on a wireless device. Using a fixed time interval may allow for seamless time-averaging SAR values to be calculated. Since different technologies change power at different rates this embodiment provides for averaging all transmission powers at constant time intervals and recording the transmitted SAR value at these time intervals for use in time-averaging. Reserve transmit power is power below the SAR transmit power limit. Power below the reserve power limit (solid line below the SAR transmit power limit) may also occur in device use. The time-averaged SAR computation is performed for the limit, and the maximum of the transmission line (stepped line below the reserve power line) and the reserve power line is used for the transmit power. This line varies depending on the usage of the mobile device (data bursts require higher transmit power) and also cell coverage (poor reception requires higher transmit power). This may lead to transmissions above the SAR limit for brief periods, as shown in FIG. 5. This embodiment allows for the high and low power transmission to cancel out in the time-averaging window. As a result, it allows for more high power transmissions in the future while maintaining at least the reserve transmitter power at all times.

A still further embodiment provides for performing short-term transmit power averaging to compute the margin used between the reserve power and the SAR transmit power limit. The allowable transmitter power is then determined for the next time interval.

An additional embodiment provides using a constant relative delta value from SAR power limit as the reserve transmit power. A mobile device may operate on multiple frequency bands using multiple antennas. Each antenna produces a characteristic emission pattern. These patterns are different for different frequency bands and each type of antenna produces a different emission pattern. Different patterns generated by different frequencies and antennas produce SAR values that reach a maximum in different areas. For each band there is a SAR power limit that is set for that frequency band. In this embodiment power is reserved as a relative back-off from the maximum transmission power per band. If the mobile device transitions to a different band at a different frequency the SAR limit may change. In such a case, the margin is subtracted to generate a new reserve power for that band. This delta value helps provide for transmit power to be reserved as a fraction of the maximum SAR power. This is particularly true for a situation where a mobile device starts transmitting in a higher power band and then move to a lower power band, the SAR value changes. In these circumstances, the reserve power limit reverts to the lower power limit. This embodiment provides for reserve power to be based on a relative percentage of the current SAR limit. The relative percentage may vary depending on the frequency in use.

Figure 6:
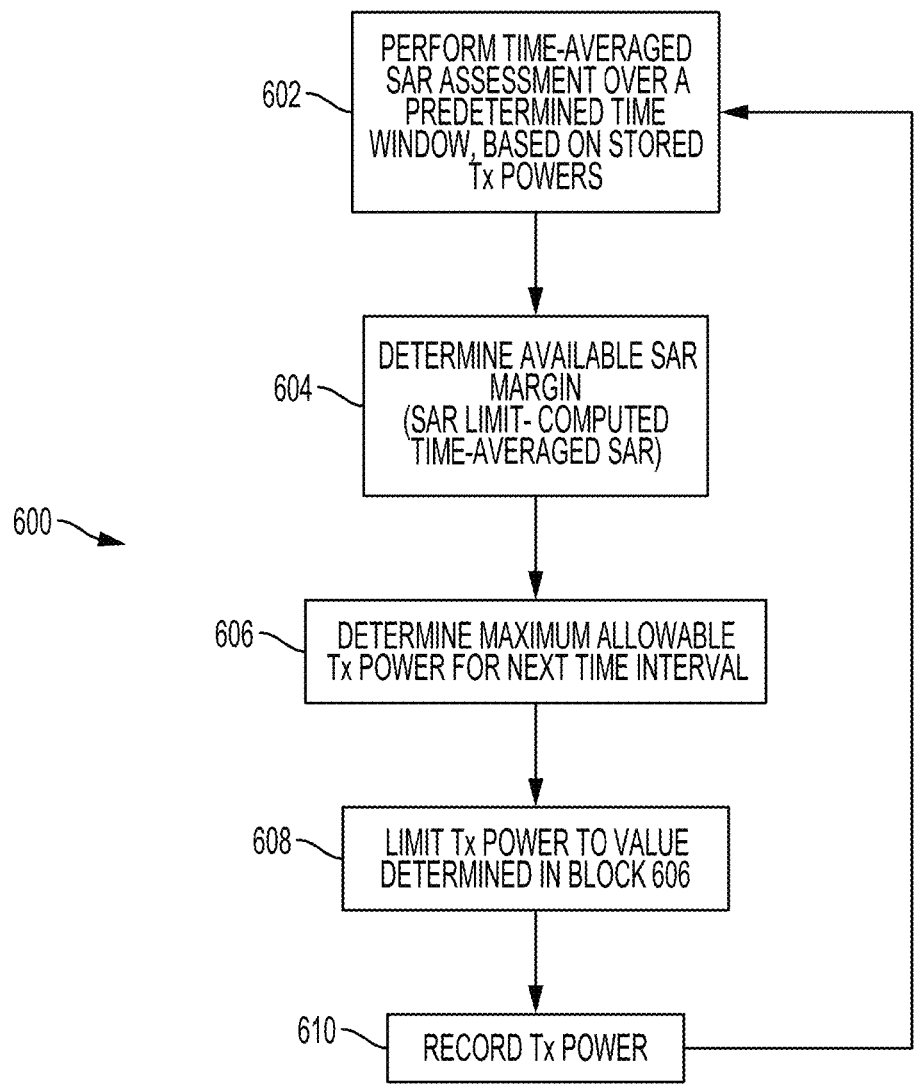
FIG. 6 is a flow diagram of a method of real-time SAR implementation, in accordance with certain embodiments of the disclosure.

FIG. 6 is a flowchart of a method for performing real-time SAR implementation in a wireless device. The method 600 begins when a time-averaged SAR assessment is performed on a mobile device over a predefined time window in block 602. The SAR values may be computed based on previously store test information for the devices as well as stored transmit power information for past time intervals. When computing time-averaged SAR, low transmit power levels below reserve transmitter powers are treated as reserve transmitter power levels, with some exceptions, as discussed previously. The predefined time window may be six minutes, however other periods of time may be used without departing from the concepts disclosed herein. In block 604, available SAR margin (difference between SAR limit and computed time-averaged SAR in block 602) for the next time interval is determined. In block 606, based on available SAR margin, a maximum allowable transmitter power is determined. This computed maximum allowable transmitter power is used for the next time interval. Depending on the available SAR margin, the computed maximum allowable transmitter power may be equal to reserve transmitter power, requiring backing off of power if transmission was at high power in the previous time interval. Similarly, when past high power transmissions at the beginning of rolling predefined time window are removed due to aging out of the window, i.e., past high power transmissions are older than predefined time window, then the communication device can return to transmission at high power. In block 608, communication device is limited to transmit at power less than or equal to computed maximum allowable transmitter power in block 606. At block 610, the actual transmitted power for current time interval is stored and the method goes back to block 602 to continue the process until completion of transmission (call termination). This method allows for an earlier back-off of transmitter power in order to preserve margin for continued transmitter operation and avoids call termination due to SAR limits.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitter over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM EEPROM, CD-ROM or other optical disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the embodiments described herein. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A method for optimizing time-averaged transmitter power, comprising:
computing a time-averaged specific absorption rate (SAR) over a predefined time window;
determining a maximum allowable transmitter power level for a future fixed time interval;
transmitting at the maximum allowable transmitter power level or at a level less than the maximum allowable transmitter power level for a current fixed time interval;
reducing a transmitter power level based on the computed time-averaged SAR value; and
computing and storing a current average transmit power for the current fixed time interval.

2. The method of claim 1, wherein the predefined time window is six minutes and the fixed time interval is five seconds.

3. The method of claim 1, wherein reducing the transmitter power level to a reserve power level occurs when the computed time-averaged SAR value approaches a SAR limit within the predefined time window.

4. The method of claim 1, wherein optimizing time-averaged transmitter power occurs every fixed time interval.

5. The method of claim 1, wherein determining a maximum allowable transmitter power level for a future time interval is a based on a SAR margin.

6. The method of claim 5, wherein the SAR margin is a difference between a SAR limit and the computed time-averaged SAR value.

7. The method of claim 5, further comprising:
ensuring that the transmitter power level does not exceed the determined maximum allowable transmitter power.

8. The method of claim 5, wherein the determined maximum allowable transmitter power is equal to a reserve transmit power.

9. The method of claim 5, wherein the time-averaged SAR is calculated by treating all transmit powers below the reserve transmitter power as reserve transmitter power values.

10. The method of claim 1, wherein the time-averaged SAR is computed every fixed time interval.

11. The method of claim 10, wherein the time-averaged SAR is computed in at least one frequency band.

12. The method of claim 1, wherein computing a SAR over a predefined time window incorporates subtracting a constant relative SAR margin.

13. The method of claim 12, wherein the constant relative SAR margin corresponds to a reserve transmitter power.

14. A communication device, comprising:
at least one antenna;
a transmitter in communication with the at least one antenna; and
a processor in communication with a memory, the processor configured to:
perform a time-averaged specific absorption rate (SAR) assessment over a predetermined time window;
determine an available SAR margin;
determine a maximum allowable transmit power for a next fixed time interval based on the available SAR margin; and
limit transmission power of the transmitter to the maximum allowable transmit power during the next fixed time interval.

15. The apparatus of claim 14, wherein the processor is further configured to:
limit the transmission power to a reserve transmit power level when the available SAR margin is zero.

16. The apparatus of claim 14, wherein the available SAR margin comprises a difference between a SAR limit and the time-averaged SAR.

17. The apparatus of claim 14, wherein the time-averaged SAR assessment is based on transmit power levels of transmission which occurred prior to the next fixed time interval during the predetermined time window.

18. The apparatus of claim 14, wherein the time-averaged SAR assessment is performed every fixed time interval over the predetermined time window.

19. The apparatus of claim 14, wherein the processor is further configured to:
determine an actual transmission power that occurred during the next fixed time interval; and
update the time-average SAR assessment based on the actual transmission power.

20. An apparatus, comprising:
means for computing a time-averaged specific absorption rate (SAR) over a predefined time window;
means for determining a maximum allowable transmitter power level for a future fixed time interval;
means for transmitting at the maximum allowable transmitter power level or at a level less than the maximum allowable transmitter power level for a current fixed time interval;
means for reducing a transmitter power level based on the computed time-averaged SAR value; and
means for computing and storing a current average transmit power for the current fixed time interval.

21. The apparatus of claim 20, wherein the means for computing a time-averaged SAR over a predefined time window uses a predefined time window of six minutes and a fixed time interval of five seconds.

22. The apparatus of claim 20, wherein the means for reducing a transmitter power level based on the computed time-averaged SAR value incorporates means for reducing the transmitter power to a reserve power level when the computed time-averaged SAR value approaches a SAR limit within the predefined time window.

23. The apparatus of claim 20, wherein the means for computing a time-averaged SAR includes means for computing a time-averaged SAR value includes means for computing a SAR margin.

24. The apparatus of claim 23, further comprising: means for ensuring that the transmitter power level does not exceed the determined maximum allowable transmitter power.

25. The apparatus of claim 20, wherein the means for computing a time-averaged SAR includes means for subtracting a constant relative SAR margin.

26. A non-transitory computer-readable medium containing instructions, which when executed cause a processor to perform the following steps:
computing a time-averaged specific absorption rate (SAR) over a predefined time window;
determining a maximum allowable transmitter power level for a future fixed time interval;
transmitting at the maximum allowable transmitter power level or at a level less than the maximum allowable transmitter power level for a current fixed time interval;
reducing a transmitter power level based on the computed time-averaged SAR value; and computing and storing a current average transmit power for the current fixed time interval.

27. The non-transitory computer-readable medium of claim 26, further comprising instructions for computing a time-averaged SAR over the predetermined window of six minutes and the fixed time interval of five seconds.

28. The non-transitory computer-readable medium of claim 26, further comprising instructions for reducing the transmitter power level to a reserve power level when the computed time-averaged SAR value approaches a SAR limit within the predefined time window.

29. The non-transitory computer-readable medium of claim 26, further comprising instructions for optimizing the time-averaged transmitter power every fixed time interval.

30. The non-transitory computer-readable medium of claim 26, wherein the time-averaged SAR is calculated by treating all transmit powers below a reserve transmit power as reserve transmitter power values.

* * * * *